United States Patent

Moore, Jr. et al.

[11] 4,044,249
[45] Aug. 23, 1977

[54] VOLTAGE SUPPLY INCLUDING BILATERAL ATTENUATOR

[75] Inventors: Charles E. Moore, Jr.; Sammy L. Crane; Donald L. Lipke, all of Garland, Tex.

[73] Assignee: A Division of Varo, Inc. Biometrics Instrument Corporation, Garland, Tex.

[21] Appl. No.: 640,687

[22] Filed: Dec. 15, 1975

[51] Int. Cl.² ............................................. H01J 39/12
[52] U.S. Cl. ............................... 250/213 VT; 250/207; 315/12 R; 315/171; 323/75 F
[58] Field of Search .................... 250/213 VT, 207; 315/149, 151, 158, 160, 171, 10, 12 R, DIG. 4, 194; 323/4, 22 T, 75 F

[56] References Cited

U.S. PATENT DOCUMENTS

| 3,222,572 | 12/1965 | Powell, Jr. ............... | 315/151 |
|---|---|---|---|
| 3,316,427 | 4/1967 | Muskovac ................. | 315/194 X |
| 3,361,931 | 1/1968 | Vollrath .................... | 315/158 |
| 3,581,098 | 5/1971 | Hoover ..................... | 250/213 VT |
| 3,694,659 | 9/1972 | Ramsay et al. ............ | 315/10 X |
| 3,711,720 | 1/1973 | Kryder ..................... | 250/213 VT |
| 3,848,123 | 11/1974 | Parker et al. ............. | 250/213 VT |

Primary Examiner—Eugene R. LaRoche
Attorney, Agent, or Firm—Richards, Harris & Medlock

[57] ABSTRACT

The specification discloses a voltage supply system particularly adapted for use as an automatic brightness control for an image intensifier tube. The system includes a power oscillator for applying a constant A.C. voltage to a first multiplier which generates at least one constant D.C. voltage for application to the screen of the image intensifier tube. A regulator circuit includes a low power oscillator which generates a control A.C. signal and which further includes circuitry responsive to the screen current of the image intensifier tube for varying the amplitude of the control A.C. signal. The frequency of the control A.C. signal is substantially greater than the frequency of the constant A.C. voltage. A bilateral attenuator receives the constant A.C. voltage and is operable in response to the control A.C. signal for varying the amplitude of the constant A.C. voltage. A second multiplier is connected to the output of the attenuator for generating a variable D.C. voltage for application to the microchannel plate of the image intensifier tube.

13 Claims, 4 Drawing Figures

VOLTAGE SUPPLY INCLUDING BILATERAL ATTENUATOR

FIELD OF THE INVENTION

This invention relates to a voltage supply system, and more particularly relates to circuitry for providing a constant D.C. voltage and variable D.C. voltage from a single A.C. power source.

THE PRIOR ART

Image intensifier tubes are commonly used in a variety pf applications for sensing and amplifying radiation images of low intensity. For example, such image intensifiers are used in battlefield environments when it is desired to use dimly illuminated targets. Typically, such image intensifiers include a microchannel plate (MCP) comprised of a bundle of discrete hollow glass tubes or channels which are capable of amplifying an electron image by many orders of magnitude. The electron images are generated by a photocathode in response to the incident radiation image. The multiplied electron image from the microchannel plate is directed onto a phosphorous screen for providing an intensified display of the sensed radiation image.

D.C. voltages are applied to drive the various stages of the image intensifier tubes, such as the screen, cathode, corrector, cone and the MCP of the tube. These voltages are critical, as even slight variations in the D.C. voltages may cause distortion in the displayed image.

At low light levels, the D.C. voltage applied to the microchannel plate is normally maintained at a constant level. However, at higher light levels sensed by the image intensifier tubes, the microchannel plate is subject to saturation. Automatic brightness control systems have thus been heretofore developed for limiting accelerated voltage imposed upon the microchannel plate, thereby reducing the rate of out gassing of the plate, prolonging the life of the tube and providing a constant, comfortable light level to the viewer.

Regulated voltage supplies have heretofore been developed for operating image intensifier tubes of the wafer type and to provide automatic brightness control to the microchannel plate of the tube. Examples of such previously developed systems are disclosed and claimed in U.S. Pat. Nos. 3,666,957 and 3,739,178, 3,816,744 and 3,864,595. Such previously developed systems have generally required at least one fixed A.C. oscillator in combination with a multiplier for generating the fixed level D.C. output signals for application to the screen and other portions of the image intensifier tube. The prior systems have, however, also required a separate variable oscillator having an output whose amplitude is directly varied in response to sensed screen current of the image intensifier tube. The output of such a variable oscillator was provided to control the microchannel plate of the tube in order to provide automatic brightness control. Such previously developed systems have thus required additional complex oscillator circuitry which not only increases the power loss and the expense of the system, but also increases the space necessary for packaging of the extra circuitry, a substantial problem when it is desired to package the entire image intensifier tube in a relatively small space.

Attempts have been made to develop systems utilizing only a single oscillator in order to eliminate the previously described problems. For example, it has been heretofore known to use a single oscillator to drive one or more multipliers to derive constant D.C. voltages. In such systems, to provide automatic brightness control, the tube screen current is sensed by regulating circuitry which controls a high voltage transistor which in turn moves the ground point of one of the multipliers in order to selectively vary the output voltage of the multiplier. Movement of the ground point of the multiplier was accomplished by raising or lowering the impedance between the ground side of the microchannel plate multiplier and the actual circuit ground. However, the transistor utilized for such circuits is required to be rated at high voltage and must exhibit extremely low leakage currents over the full operating temperature range of the system, as well as fitting within a prescribed small space. Transistors meeting these requirements must be hand selected and are quite expensive and difficult to find.

A need has thus arisen for a system utilizing only a single oscillator which can provide any selected number of constant D.C. voltages, and yet which can also provide a variable D.C. voltage for application to the microchannel plate of the image intensifier tube, without the requirement of expensive high voltage transistors and the like. In addition, such a system should have excellent response times and should provide isolation of the screen current from any imposed A.C. voltage components.

SUMMARY OF THE INVENTION

In accordance with the present invention, a voltage supply system for an image intensifier tube includes an oscillator for generating a constant A.C. voltage. A first multiplier is responsive to the constant A.C. voltage for generating at least one constant D.C. voltage for application to the image intensifier tube. A regulator circuit is responsive to the screen current of the image intensifier tube for varying the amplitude of the constant A.C. voltage. A second multiplier is responsive to the varied A.C. voltage for generating a D.C. voltage for application to the microchannel plate of the image intensifier tube.

In accordance with another aspect of the invention, a system for controlling the amplitude of an output signal in dependence upon a variable sensed signal includes an oscillator for generating a constant A.C. output signal. A rectifying bridge receives the A.C. output signal. A transistor is connected at its collector and emitter across the bridge. A regulating circuit is responsive to the variable sensed signal for applying an A.C. control signal to the base of the transistor in order to control the amplitude of the voltage appearing at the output of the bridge. Circuitry converts the voltage appearing at the output of the bridge into a D.C. output voltage.

In accordance with a more specific aspect of the invention, a bilateral controllable attenuator is provided to vary the amplitude of an alternating current signal and includes a rectifying bridge including four interconnected diodes. An input junction is formed between a pair of diodes for receiving the alternating current signal. An output junction is formed between another pair of the diodes for generating an output signal. A variable semiconductor impedance is connected across the junctions between the pairs of diodes and includes a control electrode. Circuitry generates an A.C. control signal having a higher frequency than the alternating current signal, the amplitude of the A.C. control signal being variable. Circuitry applies the A.C. control signal to the control electrode of the variable semiconductor impedance for controlling the resultant amplitude of the output signal.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
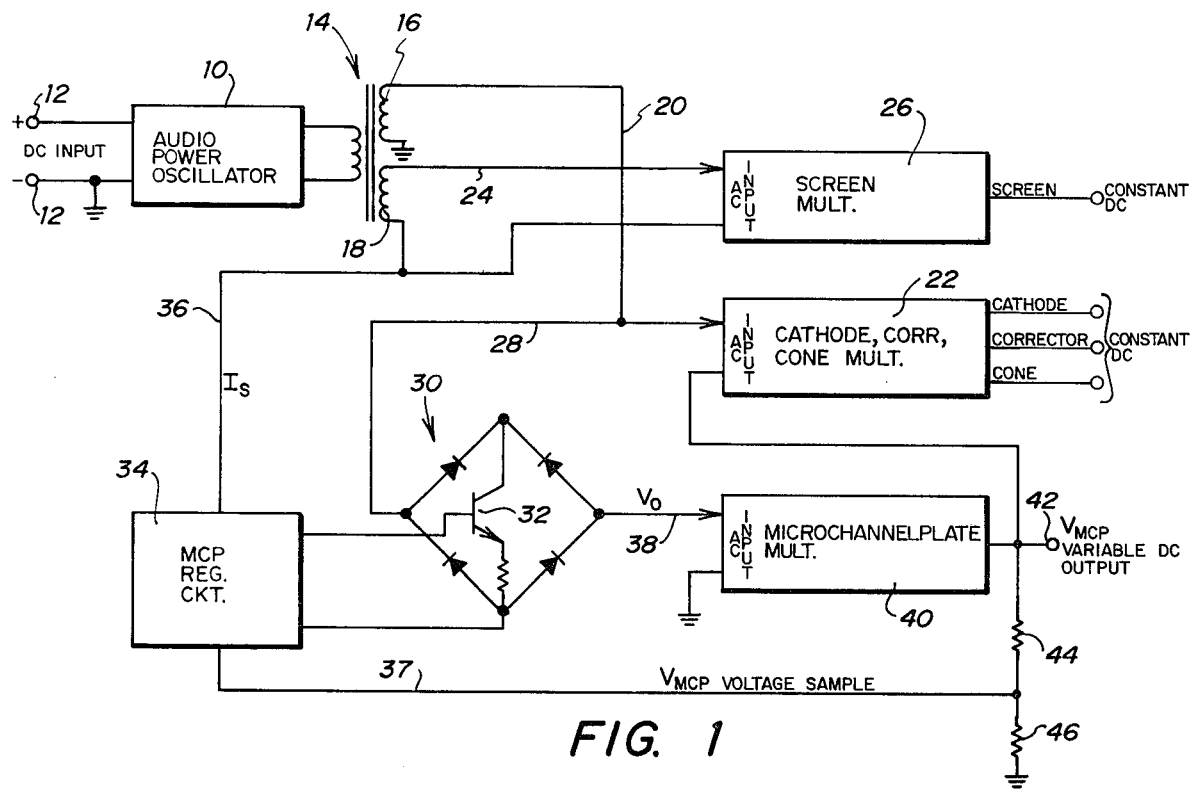
FIG. 1 is a block diagram of the system for supplying voltage to an image intensifier tube.

Referring to FIG. 1, the block diagram is shown of the present system for supplying voltage regulation and control wherein accurately controlled constant and variable D.C. voltages are required. The present system is particularly useful for regulation of the fixed D.C. voltage and of the microchannel plate D.C. voltage in a second generation inverter and wafer tube intensifier, although the system could be utilized for a variety of other purposes.

Referring to FIG. 1, a power oscillator 10 receives a D.C. voltage input at terminal 12. When the system is being utilized to regulate D.C. voltage supplied to the microchannel plate of a tube intensifier system, the D.C. voltage supplied to terminal 12 will generally be in the range of two to three volts. Oscillator 10 may comprise any suitable oscillator for providing a constant A.C. output of the desired frequency. In the preferred embodiment, the output frequency will be in the frequency range of between 5 KHz to 25 KHz. The output of oscillator 10 is applied to a transformer 14 which includes two output windings 16 and 18. Output winding 16 applies a constant amplitude A.C. voltage via lead 20 to a cathode, corrector and cone multiplier 22.

The multiplier 22 comprises a conventional multiplying circuit comprising several stages, each of which doubles the zero to peak input A.C. voltage and rectifies the voltage such that a constant high D.C. voltage is provided at the output thereof. Typical multiplying circuits are disclosed in U.S. Pat. Nos. 3,666,957, 3,816,744 and 3,864,595. The multipliers will generally comprise a multistage lattice configuration of capacitors and diodes. Multiplier 22 thus provides three constant D.C. voltages for application to the cathode, the corrector and the cone of a tube intensifier system. Typical tube intensifier systems are shown and described in U.S. Pat. Nos. 3,666,957 and 3,864,595.

It will be understood that the output voltages generated by multiplier 22 will vary for different applications, but a typical cathode output voltage that would be −3KV, a typical corrector output voltage would be −2.5KV and a typical cone output voltage would be +0.5KV.

Output winding 18 provides a constant amplitude A.C. voltage via lead 24 to a screen multiplier 26. Multiplier 26 comprises a multiplier similar to multiplier 22 and includes a plural stage lattice network of capacitors and diodes to double and rectify the A.C. voltage to provide a constant D.C. output. The D.C. from multiplier 26 is applied to the screen of the tube intensifier and will typically be provided with an amplitude of +6KV D.C.

The voltage of output winding 16 is also applied via lead 28 to a bilateral attenuator 30. Attenuator 30 includes, as will be subsequently described in greater detail, a four diode bridge having a transistor 32 connected thereacross. The base of transistor 32 is controlled by a microchannel plate (MCP) regulator circuit 34 which controls the operation of transistor 32. The screen current $I_s$ generated by the screen multiplier 26 is sensed by the MCP regulator circuit 34 by a lead 36 connected to the screen multiplier 26. The MCP regulator circuit also senses the microchannel plate voltage $V_{MCP}$ via a lead 37. In response thereto, the regulator circuit 34 generates an A.C. control signal to the base of transistor 32 in order to vary the amplitude of the A.C. signal generated from the bilateral attenuator 30.

The varied A.C. output signal is applied via lead 38 to the microchannel plate multiplier 40. Multiplier 40 comprises a typical multistage parallel multiplier of the type previously noted in order to generate a D.C. output at terminal 42 for application to the microchannel plate of the image tube. As will be subsequently described, the output at terminal 42 in the preferred embodiment is variable from a range such as approximately zero to −1KV in order to properly control the image intensifier tube. The output voltage from the multiplier 40 is also applied across a voltage divider comprising resistors 44 and 46 in order to generate the microchannel plate voltage output sample on lead 37 which is applied to the regulator circuit 34.

The present circuit thus operates to generate a plurality of constant D.C. output voltages for application to the screen, cathode, corrector, and cone of an image intensifier tube. Utilizing only a single power oscillator, the present circuit also generates a variable amplitude D.C. signal for application to the microchannel plate of the image intensifier tube. As is known, at low light levels, it is desired that the microchannel plate voltage of an image intensifier tube be constant over changes in temperature, input voltage and the like. However, at high light levels being sensed by the intensifier tube, it is desired to control the brightness of the tube screen by controlling the microchannel plate voltage. Since the screen current of the image intensifier tube is a function of the light incident upon the tube cathode, the present circuit reduces the microchannel plate voltage when the screen current rises to a predetermined level. The gain of the image intensifier tube is thus reduced to limit the screen brightness to a comfortable viewing level and to prevent saturation of the tube. An important aspect of the present invention is that this function is accomplished with the use of only a single power A.C. oscillator and with improved response time and isolation of the screen current from A.C. components.

Figure 2:
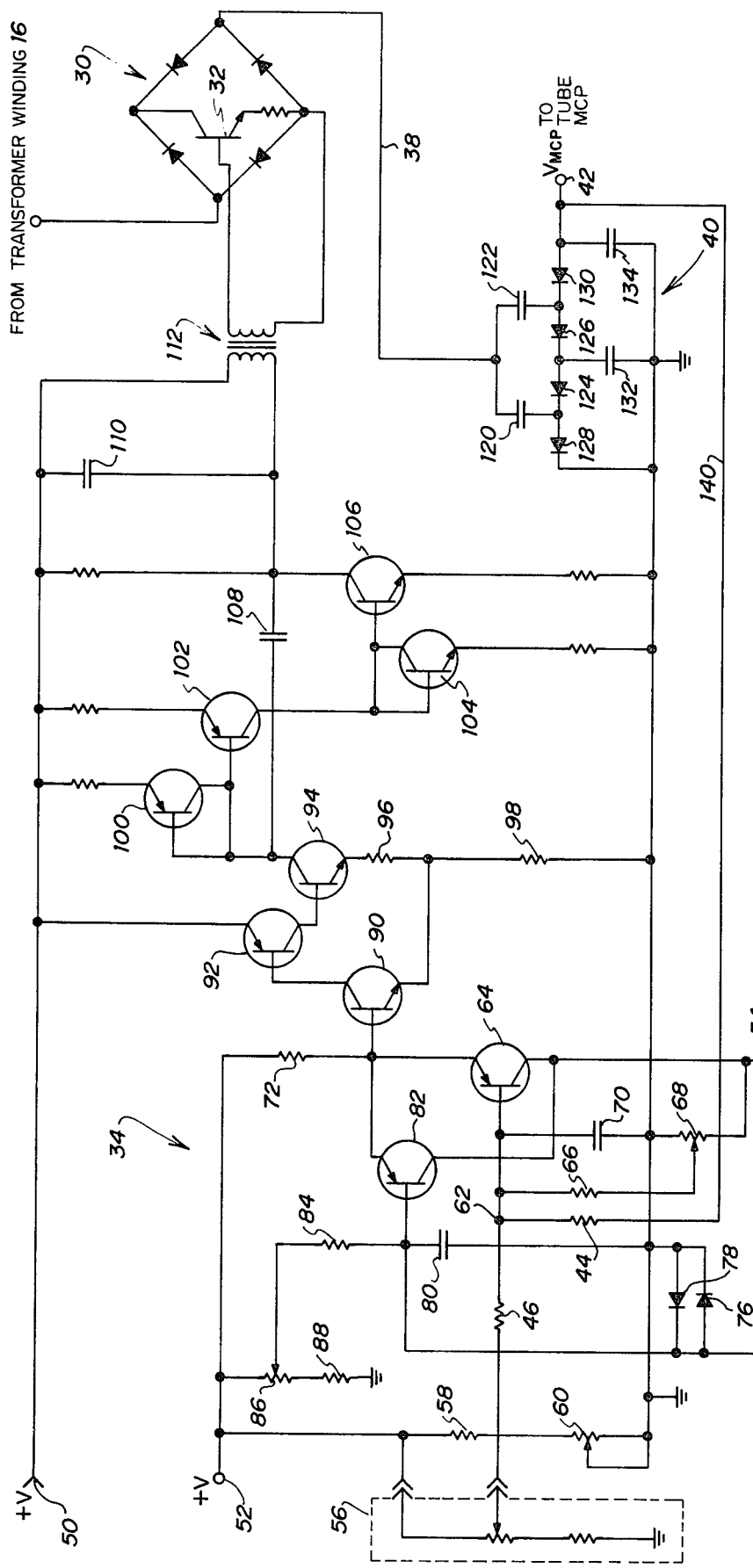
FIG. 2 is a schematic diagram of a portion of the circuitry shown in FIG. 1.

FIG. 2 illustrates in schematic detail the MCP regulator circuit 34, the MCP multiplier 40 and the bilateral attenuator 30. Suitable bias voltage is applied to the circuitry at terminal 50. A positive bias voltage is applied to terminal 52 and a negative bias voltage at terminal 54. The voltage applied to terminals 50, 52 and 54 may be derived from rectification and filtering of the A.C. output from oscillator 10. A variable resistance 56 is connected external of the circuit in order to enable external adjustment of the tube gain. A fixed resistance 58 is connected in series with a variable resistance 60 and circuit ground. Variable resistor 60 may be adjusted to provide the desired minimum microchannel plate voltage. The variable element of the variable resistor 56 is connected in series with the resistors 46 and 44 which comprise the voltage divider connected to sense the output of the MCP multiplier 40, as previously shown in FIG. 1.

The resistors 44 and 46 are temperature matched. The junction point 62 between the resistors 44 and 46 provides a sample of the microchannel plate voltage for sensing by the circuit and is applied to the base of a transistor 64. A fixed resistor 66 is connected to the variable arm of a variable resistance 68 which is connected between circuit ground and bias terminal 54. The variable resistance 68 may be adjusted to set the maximum microchannel plate voltage desired. A capacitor 70 is connected between the base of transistor 64 and circuit ground to filter A.C. ripple. Transistor 64 is connected at its collector to the negative bias terminal 54 and at its emitter through a resistor 72 to the source of positive bias at terminal 52.

Terminal 74 is connected to the screen multiplier 26 in order to enable the sensing of the screen current $I_s$. Diodes 76 and 78 are connected in opposite directions in parallel and are connected at common terminals to terminals 74. The other common terminal of diodes 76 and 78 is connected to circuit ground. Capacitor 80 is connected between the base of a transistor 82 and circuit ground. The diodes 76 and 78 operate as a clamp to prevent signals from going past predetermined positive or negative points in order to improve the response time of the circuit. Capacitor 80 is provided to filter A.C. ripple.

Transistor 82 is connected at its collector to terminal 54 and at its emitter to resistor 72. A resistor 84 is connected between the base of transistor 82 and movable arm of a potentiometer 86. Potentiometer 86 is connected in series with fixed resistor 88 and circuit ground. The other terminal of the potentiometer 86 is connected to source of positive bias potential at terminal 52. Potentiometer 86 may be varied to set the magnitude of the screen current at which MCP voltage reduction begins.

The circuitry thus described in FIG. 2 thus comprises an OR circuit which responds to changes in either the screen current $I_s$ or in the microchannel plate voltage.

The emitter of transistor 64 is connected to the base of a transistor 90. The collector of transistor 90 is connected to the base of transistor 92, the collector of which is connected to the base of a third transistor 94. The emitter of transistor 94 is connected through resistances 96 and 98 to circuit ground. Transistors 90, 92 and 94 are interconnected to act as an amplifier for the error signal developed by the OR circuit previously described.

The output of the amplifier to the base of transistor 100 connected at the base of collector thereof to a transistor 102. Both transistors 100 and 102 are connected through suitable resistances to a source of bias voltage applied to terminal 50. Transistors 100 and 102 operate as an inverter to apply an inverted signal to the base of a transistor 104.

The base and collector of transistor 104 are connected to the base of a transistor 106. Both transistors 104 and 106 are connected through suitable resistances to obtain bias voltage. A capacitor 108 is tied between the collector of transistor 94 and the collector of transistor 106.

The present oscillator thus uses capacitive feedback, as opposed to the more common approach of using extra feedback windings on the transformer. Such capacitive feedback simplifies the transformer, which in turn decreases the cost and installation of the system. The collector of transistor 106 is also connected to capacitor 110 which is connected across the primary winding of a transformer 112. Transistors 104 and 106 and capacitors 108 and 110 operate as an oscillator to apply an oscillating signal to the transformer 112. The amplitude of the oscillation is dependent upon the sensed screen current and the sensed microchannel plate voltage, as will be subsequently described. The resulting A.C. control signal is applied to the base of the transistor 32 which is connected across the attenuator diode bridge 30 in the manner previously described.

The output of the attenuator diode bridge 30 is applied via lead 38 to the microchannel plate multiplier 40, as previously noted. It will be understood that multiplier 40 may comprise any suitable type of A.C./D.C. converter and multiplier. In the illustrated embodiment, lead 38 is connected to capacitors 120 and 122. These capacitors are interconnected across series connected diodes 124 and 126. Additional diodes 128 and 130 are connected in series. Capacitors 132 and 134 are connected across diodes 126 and 130 in the manner illustrated. The multiplier 40 multiplies the zero to peak voltage supplied thereto from the bilateral attenuator 30 and converts the A.C. signal into a D.C. signal to serve as a microchannel plate voltage $V_{MCP}$ for application to the image intensifier tube via terminal 42. As previously noted, the generated D.C. voltage is also applied via lead 140 to the voltage divider comprising the resistors 44 and 46.

In operation of the circuitry shown in FIG. 2, it will be assumed that image intensifier is operating at low light levels and therefore a very low current $I_s$ is detected by the OR circuit. In this operation, transistor 90 is rendered conductive, thereby turning transistor 92 on which turns transistor 94 on. The transistors 100 and 102 provide no gain but act as inverters. Transistor 102 then renders transistors 104 and 106 more conductive. Transistors 100 and 104 operate as diodes to compensate the emitter base drift of transistors 102 and 106, respectively. Transistor 106 thus develops an alternating voltage across the transformer 112. Transistor 106, along with capacitors 108 and 110 and the transformer 112, resonate as an oscillator having a frequency 10 or 20 times the frequency of the oscillator 10. The power oscillator 10 has a high power loss, however, the oscillator provided in FIG. 2 operates at a low power loss to provide low level drive to control the output of oscillator 10 to eliminate the requirement of a second high loss oscillator.

In operation of the system, the sampled voltage $V_{MCP}$ from the voltage divider resistances 44 and 46 controls the linear OR circuit, maintaining a balanced condition until the screen current $I_s$ rises to a predetermined threshold level. The circuit from the base of transistor 64 to the multiplier 40 is thus a closed loop. The magnitude of $V_{MCP}$ and that of $V_D$ may be varied by potentiometer 56. Transistor 64 is always conducting to an extent depending on the magnitude of $V_{MCP}$.

When the current $I_s$ rises to a threshold point due to increased light level sensed by the image intensifier tube, the threshold point being determined by potentiometer 86, the base of transistor 82 pulls down thereby rendering the transistor 82 more conductive than transistor 64. This condition causes current to be pulled from the junction of the base of transistor 90 and resistor 72, thereby rendering transistor 90 less conductive. This results in rendering transistors 92, 94, 102 and 106 more non-conductive. The decrease of conductivity of transistor 106 causes a decrease in the amplitude of the alternating signal generated by the low power oscillator. This alternating current applied from the transformer 112 to the bilateral attenuator 30 is thus decreased in amplitude. The D.C. voltage applied at terminal 42 from the multiplier 40 then decreases in magnitude, reducing the tube gain to maintain constant screen brightness.

An important aspect of the present invention is that the circuit is able to sense very low levels on the order of nanoamps.

Figure 4:
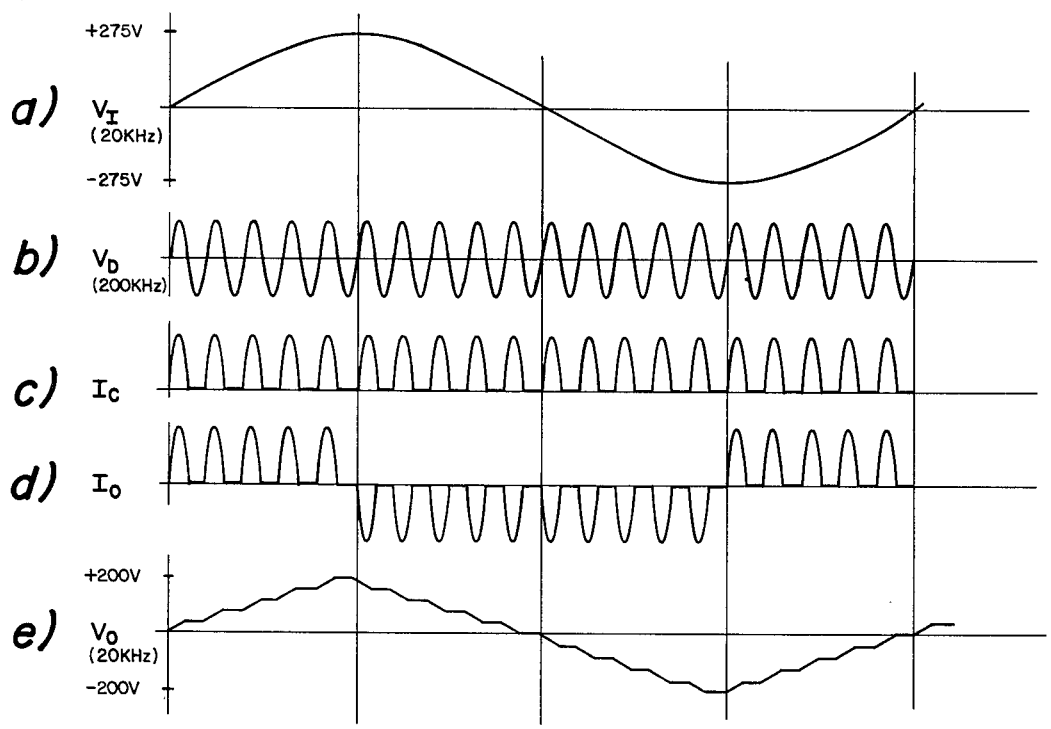
FIGS. 4a-4e comprise ideal waveforms illustrating the theory of operation of the bilateral attenuator of the present invention.
Figure 3:
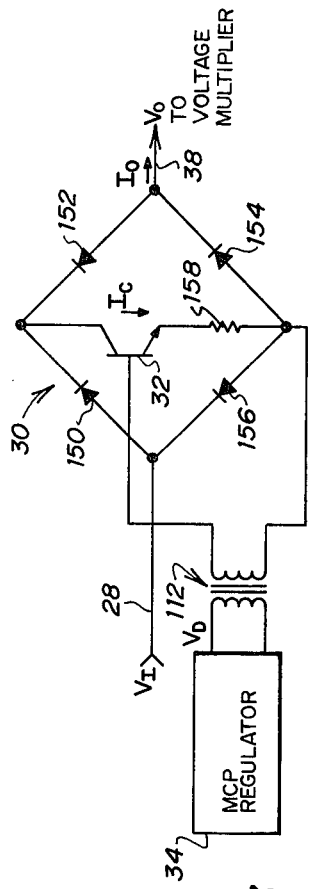
FIG. 3 is a large schematic diagram of the bilateral attenuator of the invention.

FIGS. 3 and 4 illustrate in greater detail the operation of the bilateral attenuator 30 of the invention. Referring to FIG. 3, the bilateral attenuator 30 includes a first diode 150 connected at its anode to receive the constant A.C. signal from the transformer winding 16 from the oscillator 10. The cathode of diode 150 is connected to the cathode of a second diode 152, the anode of which is connected to lead 38 for generation of a variable amplitude A.C. signal which is applied to the multiplier 40. A third diode 154 is connected at its cathode to anode of diode 152. A fourth diode 156 is connected at its anode to the anode of diode 154 and at its cathode to the anode of diode 150. Diodes 150, 152, 154 and 156 thus form a four-sided rectification bridge.

The transistor 32 is connected at its collector to the junction between diodes 150 and 152. Transistor 32 is connected through a resistance 158 to the juncture between diodes 154 and 156. The juncture is connected to the secondary of transformer 112. In addition, the secondary of transformer 112 is connected to the base of transistor 32.

FIGS. 4a–e illustrate typical idealized waveforms in order to illustrate the operation of the bilateral attenuator shown in FIG. 3. Of course, it will be understood that waveforms shown in FIG. 4 will be highly variable and the shape thereof will depend upon a number of factors such as the voltage multiplier component values, the frequency of the output from the oscillator, and the ratio of the frequency of signals from the oscillator 10 and from the regulator circuit 34 and the multiplier load. Thus, the ultimate appearance of the waveforms in an actual operating circuit could be substantially different and considerably distorted from the ideal waveforms shown in FIG. 4. However, the waveforms as illustrated are of use in illustrating the operation of the circuitry shown in FIG. 3.

The voltage shown at FIG. 4a is the constant frequency output from the oscillator 10, termed $V_I$. In the illustrated waveform, $V_I$ is provided with the frequency of 20 KHz and with an amplitude of 275 volts zero to peak. $V_I$ is applied to the input of the diode bridge illustrated in FIG. 3 via lead 28.

The voltage $V_D$ in the illustrated embodiment has a frequency of 200 KHz, which is substantially higher than the frequency of $V_I$, and comprises the voltage applied to the regulator 34 to the transformer 112. As previously noted, the amplitude of $V_D$ is varied in response to changes in the screen current $I_s$, but in the illustrated embodiment will be illustrated as a constant amplitude signal. The current $I_C$ illustrated in 4c illustrates the current passing through the transistor 32. As can be seen, the current $I_C$ is chopped such that only positive peaks occur.

The resulting current $I_o$ and voltage $V_o$ from the bilateral attenuator as applied to lead 38 to the voltage multiplier 40 are illustrated in FIGS. 4d and 4e. As may be seen, the current $I_o$ comprises positive peaks as long as the voltage $V_I$ is positive-going and comprises negative peaks as long as voltage $V_I$ is negative. In the drawings, the current is 90° out of phase with the voltage because the load is primarily capacitive. Current $I_o$ reverses polarity when $V_I$ is at 90°. The resulting output voltage $V_o$ comprises a somewhat distorted sinewave having a reduced amplitude, but having the same frequency as the input voltage $V_I$. The amplitude of the output voltage $V_o$ may of course be varied by variation of the voltage $V_D$ as applied from the regulator circuit 34.

The ratio of the reflected secondary resistance to the emitter resistor 158 of the circuit establishes a predictable current gain for the transistor 32. The voltage rating for transistor 32 must only be about 275 volts in the illustrated embodiment for a typical second generation image intensifier. Since the base of transistor 32 is floating at a relatively high voltage, it is isolated by the use of the small isolation transformer 112 from the remainder of the circuitry. The transformer 112 must have low secondary to primary capacitance to prevent loading of the high voltage A.C. and the attenuator circuit. Since the transformer 112 carries only microamps of current, the power loss of the transformer is negligible, unlike the high power loss which would be associated with a transformer used in connection with the power oscillator.

It may thus be seen that the present invention is directed to a system for varying the magnitude of a constant A.C. signal for use as an input to a high voltage multiplier which controls the microchannel plate voltage in a second generation inverter and wafer tube intensifier system. However, the present system is not limited to use with image intensifier tube applications, but has potential use in any voltage supply application wherein an accurately controlled variable D.C. voltage is required, without the requirement of multiple high loss high power oscillators and associated transformers.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A voltage supply system for an image intensifier tube comprising:
    an oscillator for generating an A.C. voltage,
    first multiplier means responsive to said A.C. voltage for generating at least one constant D.C. voltage for application to the image intensifier tube,
    a regulator circuit responsive to the screen current of the image intensifier tube and to said A.C. voltage for generating an amplitude varied A.C. voltage, and
    second multiplier means responsive to said amplitude varied A.C. voltage output from said regulator circuit for generating a D.C. voltage for application to the microchannel plate of the image intensifier tube.

2. The voltage supply system of claim 1 wherein said regulator circuit includes a bilateral attenuator for varying the amplitude of the A.C. voltage.

3. The voltage supply system of claim 2 wherein said bilateral attenuator comprises:
a diode bridge having a transistor connected thereacross.

4. The voltage supply system of claim 2 wherein said regulator circuit includes an oscillator for generating an A.C. control signal,
means for varying the amplitude of said A.C. control signal in response to the screen current and to said D.C. voltage, and
means for controlling the operation of said bilateral attenuator with said A.C. control signal.

5. The voltage supply system of claim 4 wherein the frequency of said A.C. control signal is greater than the frequency of said A.C. voltage.

6. An automatic brightness control system for an image intensifier tube having a screen and a microchannel plate comprising:
a power oscillator for generating an A.C. voltage,
a first multiplier responsive to said A.C. voltage for generating at least one constant D.C. voltage for application to the screen of the image intensifier tube,
a regulator circuit including a low power oscillator for generating a control A.C. signal and further including circuitry responsive to the screen current of the image intensifier tube for varying the amplitude of said control A.C. signal,
a bilateral attenuator for receiving said A.C. voltage and operable in response to said control A.C. signal for generating an amplitude varied A.C. voltage, and
a second multiplier connected to the output of said bilateral attenuator for receiving said amplitude varied A.C. voltage and in response thereto for generating a variable D.C. voltage for application to the microchannel plate of the image intensifier tube.

7. The automatic brightness control system of claim 6 wherein the frequency of the control A.C. signal is substantially greater than the frequency of said A.C. voltage.

8. The automatic brightness control system of claim 6 wherein said regulator circuit is also responsive to the output of said second multiplier for varying the amplitude of said control A.C. signal.

9. The automatic brightness control system of claim 6 wherein said bilateral attenuator comprises:
a first pair of series connected diodes connected across a second pair of series connected diodes.

10. The automatic brightness control system of claim 9 wherein said A.C. voltage is applied to the junction between said first pair of diodes.

11. The automatic brightness control system of claim 9 wherein the output of said attenuator is connected to the junction between said second pair of diodes.

12. The automatic brightness control system of claim 9 and further comprising:
a transistor connected at its collector and emitter across said first and second pair of diodes, the base of said transistor connected to receive said control A.C. signal.

13. The automatic brightness control system of claim 12 and further comprising:
a resistor connected in series with said transistor across said pairs of diodes.

* * * * *

UNITED STATES PATENT AND TRADEMARK OFFICE
CERTIFICATE OF CORRECTION

PATENT NO. : 4,044,249
DATED : August 23, 1977
INVENTOR(S) : Charles E. Moore, Jr.; Sammy L. Crane; Donald L. Lipke It is certified that error appears in the above-identified patent and that said Letters Patent are hereby corrected as shown below:

Col. 1, line 13, "pf" should be --of--.
Col. 5, line 27, "terminals 74." should be --terminal 74.--;
  lines 57-59, "The output of the amplifier to the base of transmitter 100 connected at the base of collector thereof to a transistor 102." should be --The output of the amplifier is applied to the base of a transistor 100 which is connected at its base and collector to the base of a transistor 102.--
Col. 7, line 63, "regulator 34 to the" should be --regulator 34 from the--;
  line 67, "in 4c" should be --in FIGURE 4c--.
Col. 8, line 8, "negative." should be --negative-going.--

Signed and Sealed this

Seventh Day of February 1978

[SEAL]

Attest:

RUTH C. MASON
Attesting Officer

LUTRELLE F. PARKER
Acting Commissioner of Patents and Trademarks